United States Patent [19]

Steil

[11] 3,727,475
[45] Apr. 17, 1973

[54] PULLEY-AND-SHAFT ASSEMBLY FOR ROTARY LAWN MOWERS AND METHOD OF MANUFACTURING THE SAME

[75] Inventor: William W. Steil, Wauwatosa, Wis.

[73] Assignee: Production Stamping Corporation, Milwaukee, Wis.

[22] Filed: Aug. 23, 1971

[21] Appl. No.: 173,982

[52] U.S. Cl...............................74/230.3, 74/230.8
[51] Int. Cl..........................F16h 55/34, F16h 55/36
[58] Field of Search...................74/432, 230.8, 230.3

[56] References Cited

UNITED STATES PATENTS 2,546,782   3/1951   Rives.................................74/230.8
2,915,908   12/1959  Warnkey............................74/230.8

*Primary Examiner*—Leonard H. Gerin
*Attorney*—Arthur L. Morsell, Jr. et al.

[57] ABSTRACT

An outer sleeve supports upper and lower bearing assemblies in which a drive shaft for a lower blade is journalled. The lower end of the shaft is friction-welded to a blade saddle and the upper end is friction-welded to the lower face of a drive pulley. The sleeve is prepared with an annular bulge intermediate its length and a support ring which fits around the sleeve is friction-welded to the lower face of the annular bulge.

9 Claims, 10 Drawing Figures

PATENTED APR 17 1973

INVENTOR
WILLIAM W. STEIL

BY
Morsell & Morsell
ATTORNEYS

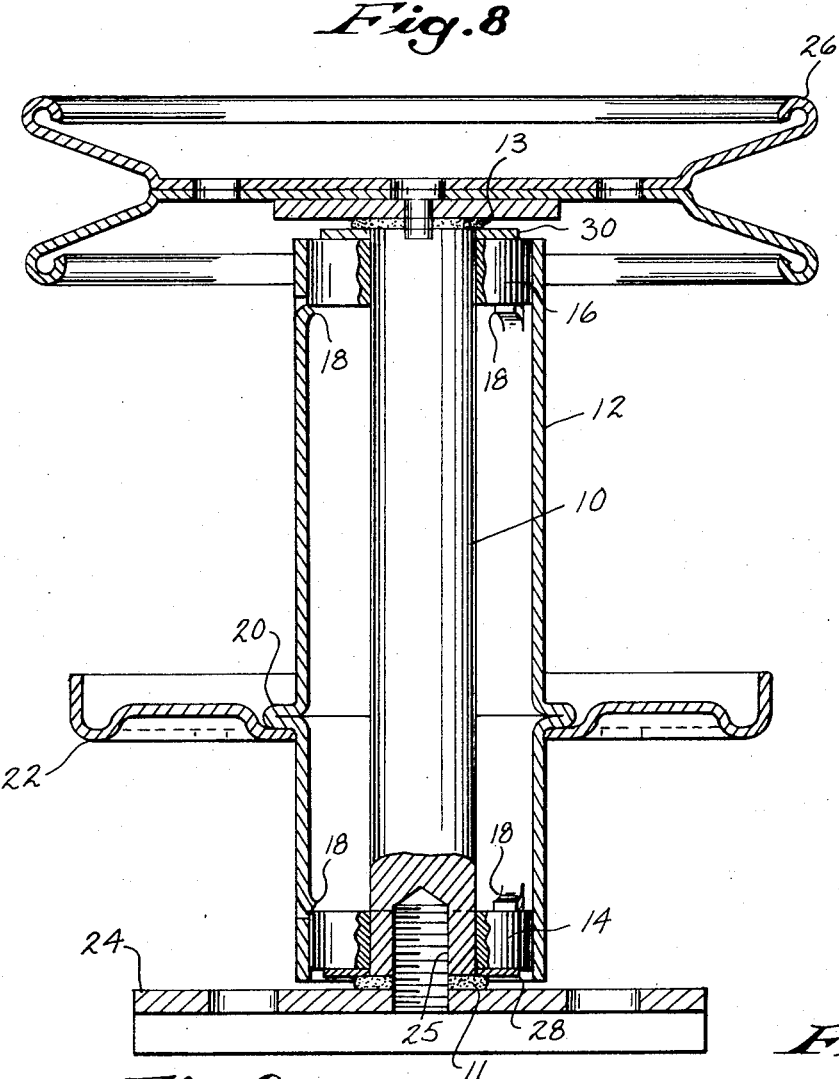
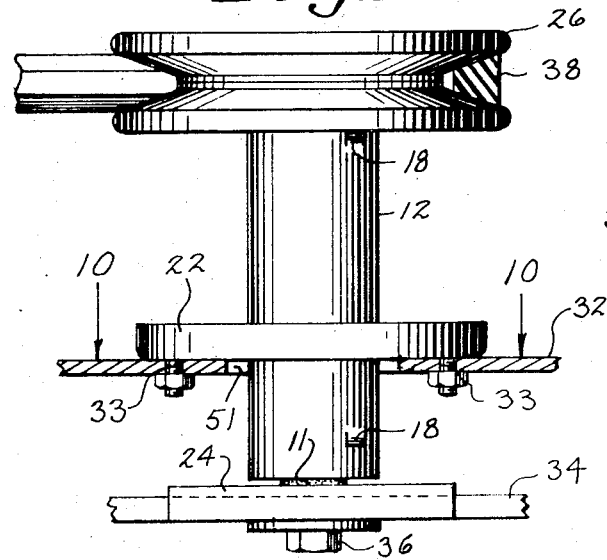
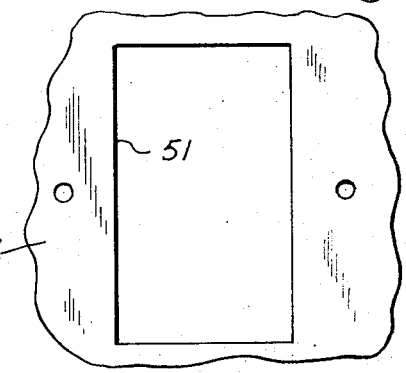
INVENTOR
WILLIAM W. STEIL
BY
Morsell & Morsell
ATTORNEYS

PULLEY-AND-SHAFT ASSEMBLY FOR ROTARY LAWN MOWERS AND METHOD OF MANUFACTURING THE SAME

BACKGROUND OF THE INVENTION

1. Field of the Invention

The present invention pertains to pulley-and-shaft assemblies for driving the mower blades of rotary lawn mowers, and is used in that type of mower where a drive shaft extends rotatably through the top of the mower housing, there being a pulley for a belt drive at the upper end of the shaft above the mower housing and there being a saddle for the mower blade at the lower end of the shaft below the mower housing.

2. Description of the Prior Art

Heretofore in the manufacture of pulley-and-shaft assemblies for the type of mower with which the present invention is concerned the pulley and blade saddle have been connected to their respective ends of the shaft with drive pins, and the shaft has been suitably supported for rotation through an opening in the top of the mower housing. This type of assembly is expensive to manufacture in that there is considerable labor involved in connecting the blade saddle and pulley to the shaft with drive pins and in performing the other assembly steps.

SUMMARY OF THE INVENTION

The present invention provides an improved pulley-and-shaft assembly for rotary lawn mowers and a novel method of manufacturing the same wherein the outer sleeve is provided with an annular outwardly-projecting bulge intermediate its length and has a mounting ring fitting around the sleeve and welded in position against the underside of the bulge, the sleeve supporting upper and lower bearings for the drive shaft, and the drive shaft having a blade saddle friction-welded to its lower end and having a pulley friction-welded to its upper end.

A general object of the invention is to provide a pulley-and-shaft assembly for rotary lawn mowers which is inexpensive, and which can be manufactured expeditiously and with a minimum of labor.

Another object of this invention is to provide a pulley-and-shaft assembly of the above character which is sturdier in structure and more reliable in operation than those heretofore known in the art.

DESCRIPTION OF THE DRAWINGS

FIG. 8 is a cross-sectional view of one embodiment of the pulley-and-shaft assembly of this invention;

FIG. 9 is an elevational sectional view showing the pulley-and-shaft assembly of FIG. 8 mounted upon the housing of a lawn mower; and FIG. 10 is a fragmentary top plan view of the lawn mower housing.

DETAILED DESCRIPTION OF THE INVENTION

Figure 1:
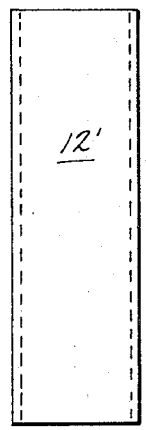
FIG. 1 is an elevational view of a hollow tube for forming the sleeve.

The present invention is concerned with an improved pulley-and-shaft assembly for rotary lawn mowers and an improved method of manufacturing the same. In the past, in such pulley-and-shaft assemblies, the drive pulley and the blade holder have been connected to their respective ends of the shaft with drive pins, not because the drive pin gave a particularly secure connection, but rather because the drive pulley and blade holder were too close to bearings to be connected by any other method. In accordance with this invention, however, a welded pulley-and-shaft assembly has been devised wherein the various parts of the assembly can be joined together by friction-welding, which procedure provides a much stronger connection than heretofore known in the art and which also is simpler and less expensive than drive pin assemblies.

Referring to FIG. 8, one embodiment of the invention comprises a drive shaft 10 which is journalled within a hollow tube 12 by means of bearings 14 and 16 which are mounted within opposing ends of the tube 12 between the drive shaft and the ends of the tube 12. The bearings 14 and 16 are held in position by means of three inwardly-extending abutments 18 at each end of the tube 12. The inwardly-extending abutments 18 are formed in the tube 12 by lancing.

An annular bulge 20 is formed in the outer surface of the tube 12 and acts as a support for a circular supporting ring 22. The supporting ring 22 is attached to the annular bulge 20 by means of friction-welding, which produces an extremely strong bond between the two members. A saddle-shaped blade holder 24 is friction-welded to one end of the drive shaft 10 as at 11 and a drive pulley 26 is friction-welded to the other end of drive shaft 10 as at 13. The pulley 26 and the blade holder 24 are spaced away from the ends of the hollow tube 12 by means of washers 28 and 30. Washers 28 and 30 bear against the inner races of the bearings 14 and 16 and protect the bearings from contamination and also act as spacers to hold the pulley 26 and saddle 24 away from the ends of the tube 12.

FIG. 9 shows the pulley-and-shaft assembly of this invention mounted in place with the hollow tube 12 extending through an opening in a lawn mower housing 32 and attached to the lawn mower housing by means of bolts 33 which engage openings in supporting ring 22. A rotary lawn mower blade 34 is attached within the saddle 24 by means of a machine screw 36. The pulley 26 is in engagement with a drive belt 38 extending from the lawn mower motor, which is not shown in the drawings.

Figure 2:
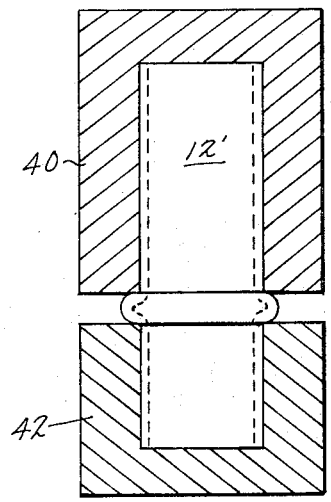
FIG. 2 is an elevational view of the tube of FIG. 1 showing it being shaped by a pair of dies, the latter being in vertical section.
Figure 3:
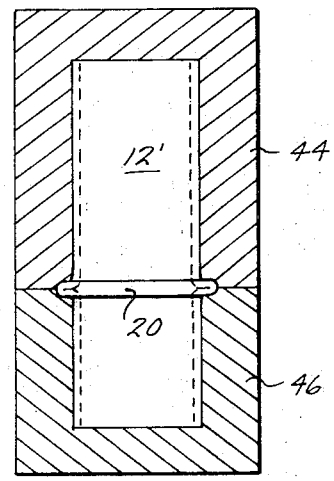
FIG. 3 is a similar view showing the tube of FIG. 2 being further shaped between another pair of dies.
Figure 4:
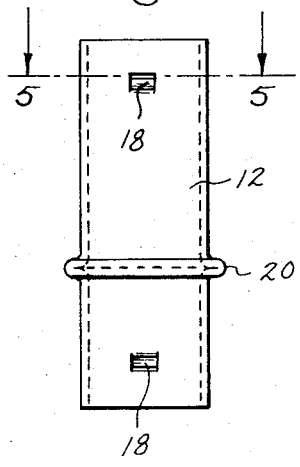
FIG. 4 shows the tube of FIG. 1 after having been shaped by the dies shown in FIGS. 2 and 3 and lanced by a lancing die.

FIGS. 1 through 3 illustrate the process of forming the annular bulge 20 in hollow tube 12. The tube 12' (FIG. 1) is initially bulged between a pair of dies 40 and 42 to form a coarse bulge as shown in FIG. 2. After the coarse bulge has been formed, the tube 12' is squeezed a second time between a different set of dies 44 and 46 which have matching annular recesses that squeeze the top and bottom edges of the bulge 20 into a more linear orientation. After the bulge 20 has thus been formed, the inwardly-projecting abutments 18 are formed by lancing the tube. After the tube has been thus prepared, the supporting ring 22 is friction-welded onto one side of the annular bulge 20.

Figure 7:
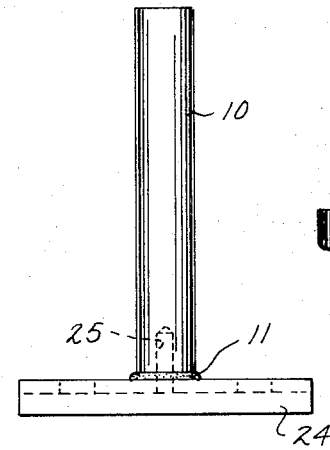
FIG. 7 is an elevational view of a drive shaft with a saddle-shaped blade holder welded to one end of the drive shaft.

In assembling the various parts of the abovedescribed pulley-and-shaft assembly, the saddle-shaped blade supporting member 24 is friction-welded to one end of the drive shaft 10 (FIG. 7) and a tapped opening 25 is formed therein to receive a machine screw. Next the washer 28 is slipped on the shaft.

Figure 6:
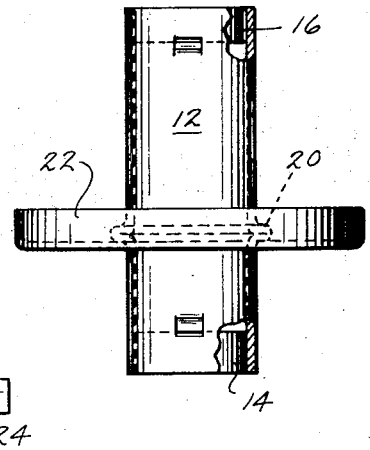
FIG. 6 is an elevational view of the tube of FIG. 4 with a supporting ring attached to the annular bulge thereon.
Figure 5:
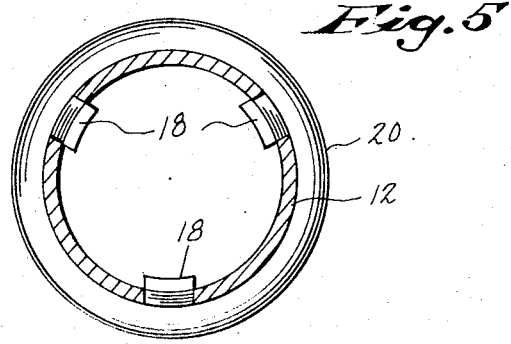
FIG. 5 is a cross-sectional view taken along the line 5—5 of FIG. 4.

The hollow tube 12 is prepared for assembly as described above and bearings 14 and 16 are inserted in the opposing ends of the tube (FIG. 6). The shaft 10 is then journalled within the tube 12, the washer 30 is slipped onto the upper end of the shaft, and the drive pulley 26 is friction-welded onto said upper end of the drive shaft 10 (FIG. 5). The pulley has a heavy disk spot-welded to its underside, and the friction-weld is between said disk and the upper end of the shaft 10. This simple procedure completes the pulley-and-shaft assembly expeditiously and with a minimum of labor.

In installing the assembly in a lawn mower the housing 32 of the lawn mower is provided with an elongated opening portion 51 of a size so that the saddle-shaped blade holder 24 may be dropped through the elongated opening portion 51. The tube is lowered until the supporting ring 22 rests on top of the mower housing as in FIG. 9. Then the assembly is bolted to the housing by the bolts 33, as shown in FIG. 9. Thereafter the lawn mower blade 34 is attached to the blade holder by use of the screw 36 and the driving belt 38 is engaged with the pulley 26.

From the foregoing description it will be clear that this invention provides a pulley-and-shaft assembly which is stronger and more reliable than those heretofore known in the art and which is inexpensive and can be manufactured expeditiously with a minimum of labor. Although this invention has been described in connection with one specific embodiment thereof, it should be understood that the invention is by no means limited to the disclosed embodiment, since many modifications can be made in the disclosed structure without altering the basic principles thereof. For example, although a circular mounting member has been used as the support means for supporting the tube 12, it will be clear to those skilled in the art that numerous other support configurations could be substituted and, also, that numerous different blade holders could be utilized in place of the saddle-shaped member disclosed herein. With regard to the method, although the formation of the annular bulge in tube 12 has been described before the welding of blade holder 24 to drive shaft 10, it will be clear that this order can be reversed without changing the essential principle of the method. These and many other modifications of the disclosed structure and method will be apparent to those skilled in the art, and this invention includes all such modifications falling within the scope of the following claims:

What I claim is:

1. A rotary lawn mower drive assembly comprising a hollow tube, a drive shaft journalled within said hollow tube, a drive pulley welded to one end of said drive shaft, means welded to the other end of said drive shaft for receiving a rotary lawn mower blade, and supporting means connected to the outer surface of said hollow tube intermediate the ends thereof.

2. A rotary lawn mower drive assembly as defined in claim 1 wherein there is an annular bulge formed on said hollow tube intermediate the two ends thereof, said supporting means being connected to said annular bulge.

3. A rotary lawn mower drive assembly as defined in claim 2 wherein said supporting means is welded to said annular bulge.

4. A rotary lawn mower drive assembly as defined in claim 3 and further comprising inwardly-extending abutments near the ends of said hollow tube forming bearing seats, first and second bearings in said tube supported on said seats and within which said drive shaft is journalled.

5. A method of manufacturing a rotary drive assembly for the blade of a rotary lawn mower, said method comprising the steps of (a) providing a rotary drive shaft; (b) welding a blade holder to one end of said drive shaft; (c) providing a hollow tube; (d) attaching support means to the exterior surface of said hollow tube intermediate the ends thereof; (e) journalling said rotary drive shaft within said hollow tube; and (f) welding a drive pulley to the other end of said drive shaft.

6. The method defined in claim 5 wherein said blade holder and drive pulley are friction welded to opposite ends of said drive shaft.

7. The method defined in claim 5 wherein said support means is friction welded to the exterior surface of said hollow tube.

8. The method defined in claim 7 wherein the step (d) comprises the following sub-steps: ($d_1$) forming an annular bulge in said hollow tube intermediate the two ends thereof; ($d_2$) forming inwardly-projecting abutments near both ends of said hollow tube; and ($d_3$) friction welding said support means to said annular bulge.

9. The method defined in claim 8 wherein the step (e) comprises the following sub-steps: ($e_1$) placing bearings within the ends of said hollow tube adjacent to said inwardly-projecting abutments; and ($e_2$) inserting said rotary drive shaft through the inner races of said bearings.

* * * * *